United States Patent
Bobby et al.

(10) Patent No.: US 7,814,923 B2
(45) Date of Patent: *Oct. 19, 2010

(54) CONTROL VALVE

(75) Inventors: Brian Bobby, North Ridgeville, OH (US); Travis G. Ramler, Elyria, OH (US); Andrew Marsh, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 399 days.

This patent is subject to a terminal disclaimer.

(21) Appl. No.: 11/844,763

(22) Filed: Aug. 24, 2007

(65) Prior Publication Data

US 2008/0030070 A1 Feb. 7, 2008

Related U.S. Application Data

(63) Continuation of application No. 11/118,054, filed on Apr. 29, 2005, now Pat. No. 7,267,413.

(51) Int. Cl.
*B60T 8/34* (2006.01)

(52) U.S. Cl. .............................. 137/15.21; 137/315.09; 251/298; 303/118.1; 303/56

(58) Field of Classification Search .............. 137/15.21, 137/315.01, 315.09, 315.27, 315.28; 251/298, 251/366; 303/118.1, 56
See application file for complete search history.

(56) References Cited

U.S. PATENT DOCUMENTS 2,657,701 A 11/1953 Hupp
3,301,272 A * 1/1967 Pettyjohn et al. ....... 137/614.06
3,690,733 A 9/1972 Gachot et al.
4,161,341 A 7/1979 Reinecke et al.
5,411,059 A * 5/1995 Sever et al. ............ 137/599.04
6,116,268 A 9/2000 Johnson
7,021,334 B1 4/2006 Helmer
7,267,413 B2 9/2007 Bobby et al.
7,575,029 B2 * 8/2009 Robinson ............... 137/614.06

FOREIGN PATENT DOCUMENTS

GB 378951 8/1932
GB 68723 1/1983
WO 06/118694 11/2006

OTHER PUBLICATIONS

International Search Report and Written Opinion from PCT/US06/010790, mailed Sep. 6, 2006.
Office action from U.S. Appl. No. 11/118,054, mailed Dec. 5, 2006.
Notice of Allowance from U.S. Appl. No. 11/118,054, mailed Apr. 27, 2007.

* cited by examiner

*Primary Examiner*—Kevin L Lee (57) ABSTRACT

A configurable control valve for use with air brake systems is provided. This control valve includes: a first or top body portion, a second or bottom body portion, and a connector for attaching the first body portion to the second body portion. The first body portion may include an actuator or handle having either a linear translation a rotational translation, and the second body portion may include either horizontal or vertical port configurations. The connector cooperates with the first body portion and the second body portion to provide complete 360° lateral rotation of the body portions relative to one another.

19 Claims, 8 Drawing Sheets

CONTROL VALVE

RELATED APPLICATIONS

The present application is a continuation of U.S. patent application Ser. No. 11/118,054, filed on Apr. 29, 2005, for CONTROL VALVE, the disclosure of which is all fully incorporated herein by reference.

BACKGROUND OF THE INVENTION

This invention relates in general to valves for use in vehicle brake systems that utilize pressurized air, and in particular to a control valve for controlling the flow of pressurized air to the brakes of a vehicle.

Large commercial combination vehicles having a tractor portion and a trailer portion often include a vehicle braking system that utilizes compressed air. Air brake systems usually include a combination of three different braking systems: the service brakes, the parking brakes, and the emergency brakes. The service brake system applies and releases the brakes when the driver uses the brake pedal during normal driving situations. The parking brake system applies and releases the parking brakes when the parking brake control is engaged. The emergency brake system utilizes portions of the service brake and parking brake systems to stop the vehicle in the event of a brake system failure. Some air brake systems include a control brake valve that allows the operator to manually control the services brakes on the trailer portion of the vehicle independently of the tractor brakes. Such control valves are particularly useful in situations where a manually-controlled pressure graduation function is desired.

Installing trailer control valves on different vehicles often involves variable plumbing configurations, and properly orientating the pneumatic lines attached to the control valve may involve the use of valve bodies having either vertically oriented ports or horizontally oriented ports. Additionally, the handle that is typically attached to the body of the control valve may be configured for either linear translation or for rotational translation depending on the arrangement of the dashboard or steering column to which the valve is attached. Thus, one of at least four different valve handle/body assemblies will often be used based on the vehicle and system in question. Manufacturing four or more versions of the same valve is redundant and expensive; thus, there is a need for a control valve that provides multiple handle and port configurations and that is compatible with a variety of vehicles and brake systems.

SUMMARY OF THE INVENTION

Deficiencies in and of the prior art are overcome by the present invention, the exemplary embodiment of which provides a configurable control valve for use with an air brake system or other type of system. In accordance with one aspect of the present invention, an air brake system for use in a vehicle is provided. This system includes: at least one source of pressurized air; at least one configurable control valve in communication with the source of pressurized air; and at least one brake in communication with the control valve. In accordance with another aspect of the present invention, a configurable control valve for use with air brake systems is provided. This control valve includes: a first or top body portion; a second or bottom body portion; and a connecting means for attaching the first body portion to the second body portion. The first body portion includes an actuator or handle having either a linear translation or an actuator or handle having a rotational translation, and the second body portion includes several different port configurations. The connecting means cooperates with the first body portion and the second body portion to provide complete 360° lateral rotation of the body portion relative to one another. In accordance with yet another aspect of the present invention, a method for assembling a control valve is provided. This method includes attaching a handle to a first body portion and using a connector to attach the first body portion to a second body portion. The first body portion and the second body portion have both been adapted to receive the connector, and the connector cooperates with the first body portion and the second body portion to allow the body portions to rotate relative to one another.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the embodiments given below, serve to explain the principles of the invention.

DETAILED DESCRIPTION OF THE INVENTION

This invention relates to a configurable valve for use with an air brake system or other systems. One embodiment of this invention provides an air brake system for use in a vehicle. This system includes: at least one source of pressurized air; at least one configurable control valve in communication with the source of pressurized air; and at least one brake in communication with the control valve. Another embodiment of this invention provides a configurable control valve for use with air brake systems. This control valve includes: a first or top body portion; a second or bottom body portion; and a connecting means for attaching the first body portion to the second body portion. The first body portion includes a handle having either a linear translation or a handle have a rotational translation, and the second body portion includes several different port configurations. The connecting means cooperates with the first body portion and the second body portion to provide complete 360° lateral rotation of the body portions relative to one another. Still another embodiment of the present invention provides a method for assembling a control valve. The method includes attaching a handle to a first body portion and using a connector to attach the first body portion to a second body portion. The first body portion and the second body portion have both been adapted to receive the connector, and the connector cooperates with the first body portion and the second body portion to allow the body portions to rotate relative to one another. The various components of this invention are typically manufactured using known manufacturing methods and techniques.

Figure 1:
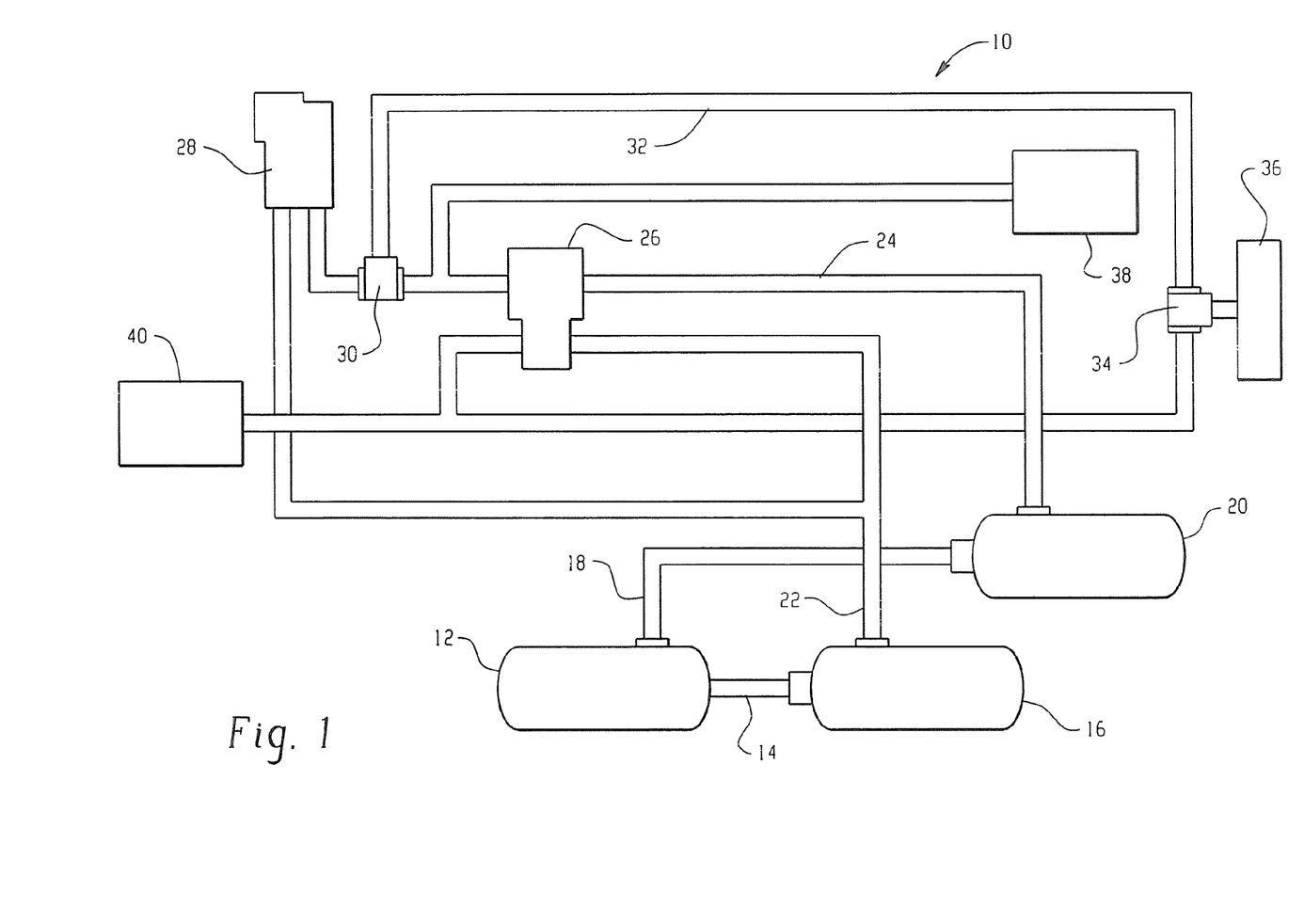
FIG. 1 is schematic diagram of an exemplary air brake system that includes the control valve of the present invention.

With reference now to the Figures, FIG. 1 provides a simplified schematic diagram of an exemplary air brake system that 10 includes the control valve of the present invention. In this system, supply reservoir 12 is connected by line 14 to front brake reservoir 16 and by line 18 to rear brake reservoir 20. Lines 22 and 24 connect reservoirs 16 and 20 respectively to foot valve 26. Line 22 also connects reservoir 16 to control valve 28 and line 24 connects foot valve 26 to control valve 28 through double check valve 30. Line 24 also connects foot valve 26 to rear brakes 38. Line 32 connects double check valve 30 to a second double check valve 34 which is in communication with tractor protection valve 36. Line 32 also connects double check valve 34 to foot valve 26 and to front brakes 40.

Figure 2:
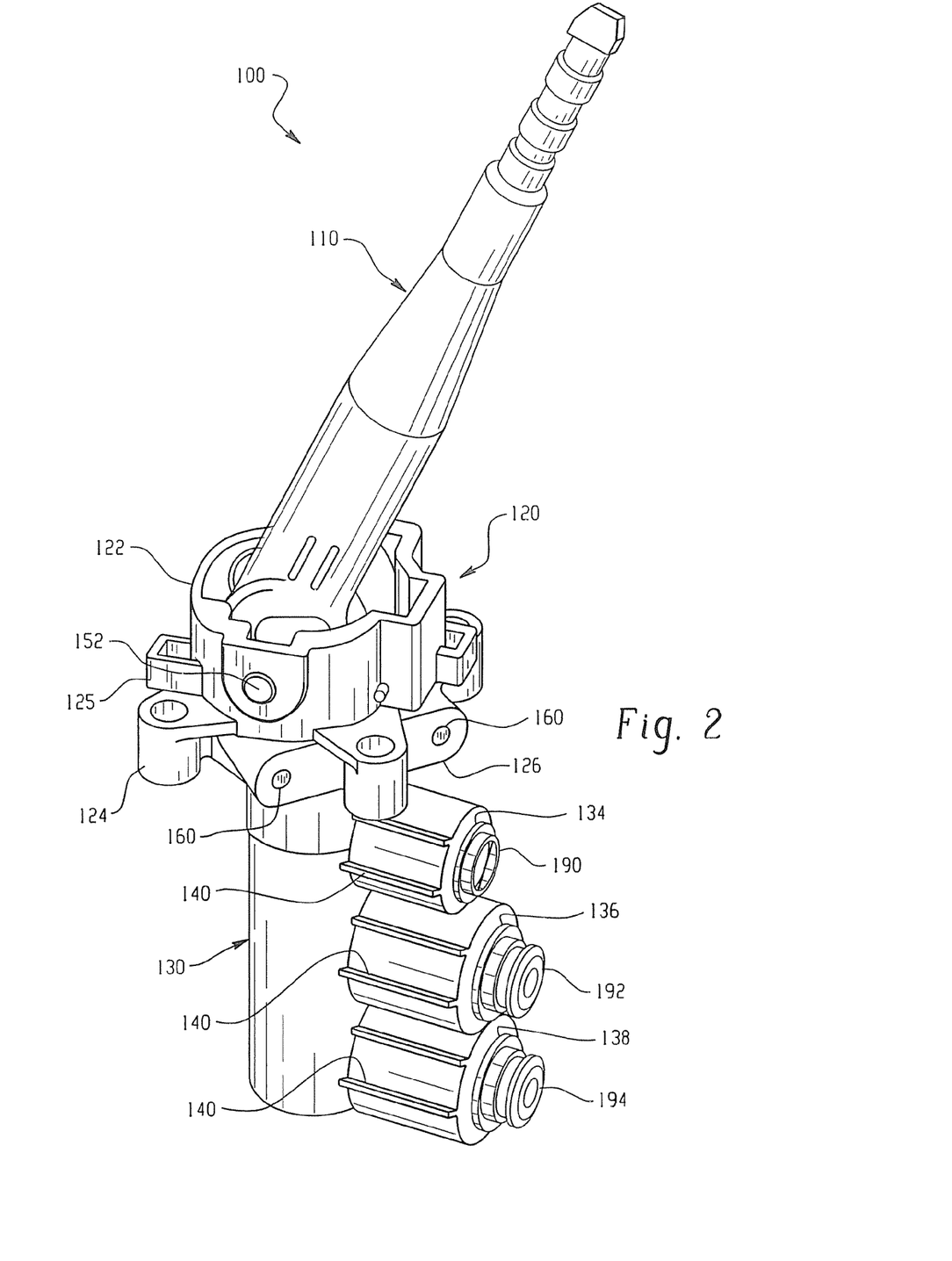
FIG. 2 is a perspective view of the embodiment of control valve of the present invention that includes a handle having a linear translation and a body having horizontally oriented ports.
Figure 5A:
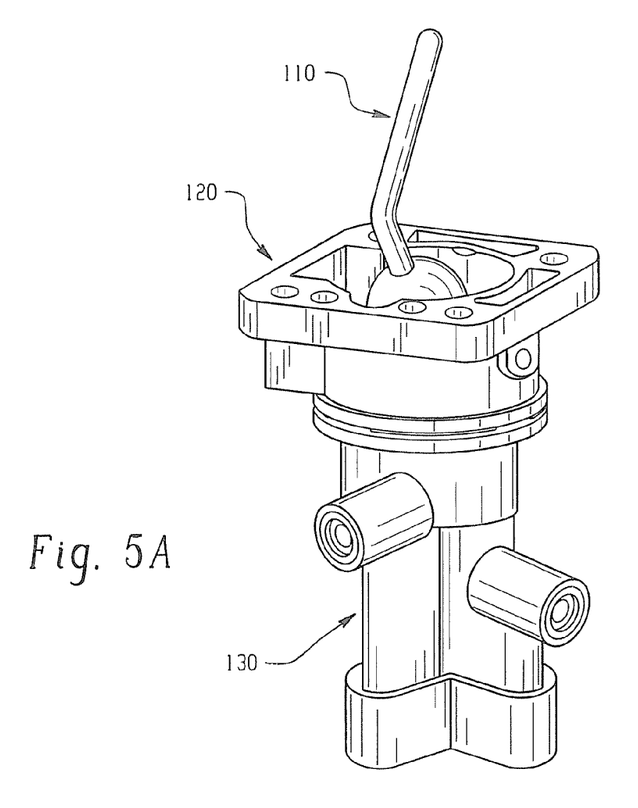
FIGS. 5A-D are perspective views of two possible handle configurations for the upper body portion of the control valve of the present invention and two possible port configurations for the lower body portion of the control valve.
Figure 5B:
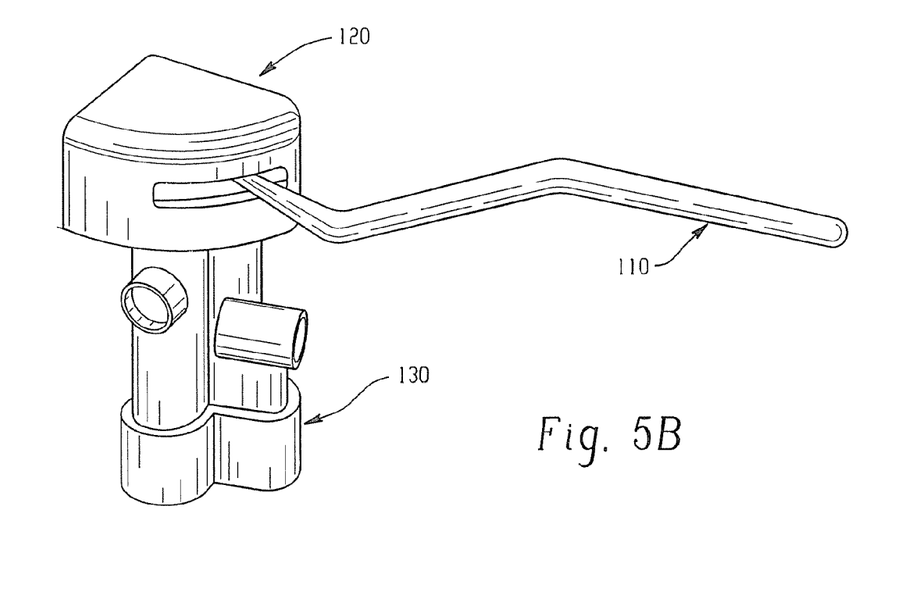

As shown in FIG. 2, an exemplary embodiment of control valve 100 includes a handle 110, which may have a linear translation (see FIG. 5A) or a rotational translation (see FIG. 5B). Handle 110 is pivotally attached to the valve body by pivot pin 152 and is typically moveable between a first and a second position, and may be held in one position or the other by a torsion spring 170 (see FIG. 2-3) or other biasing member. Valve 100 also includes a first or "upper" body portion 120 and a detachable second or "lower" body portion 130. In the exemplary embodiment shown in the Figures, upper body portion 120 includes a handle receiving portion 122, a plurality of mounts 124 adapted to receive the bolts used to mount control valve 100 to a surface within the vehicle's cab, a plurality of cover mounts 125 for receiving a cover that snaps over upper body portion 120, a base 126 that includes two bores 127 for receiving groove pins 160, which cooperate with collar or flange 132 and groove 133 to provide a connecting means for attaching upper body portion 120 to lower body portion 130 (see description below).

Figure 5C:
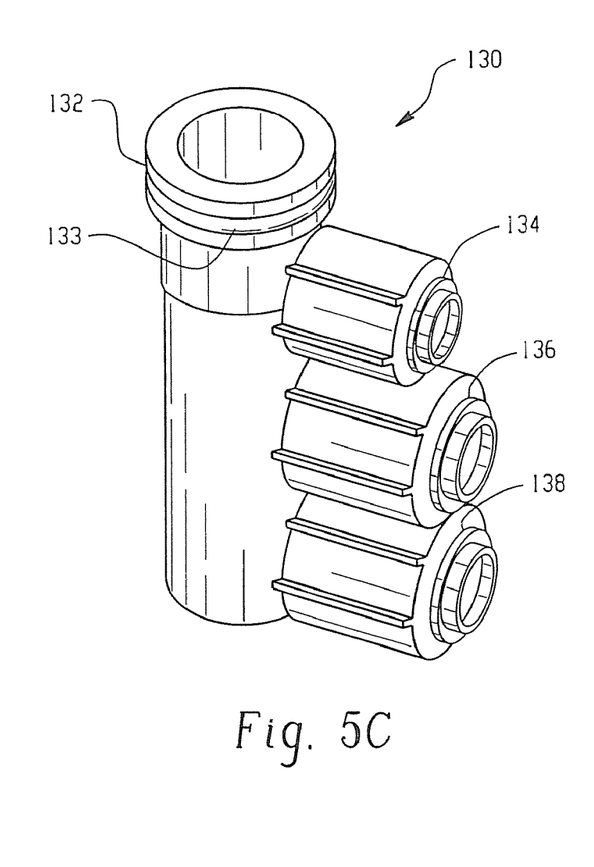
Figure 5D:
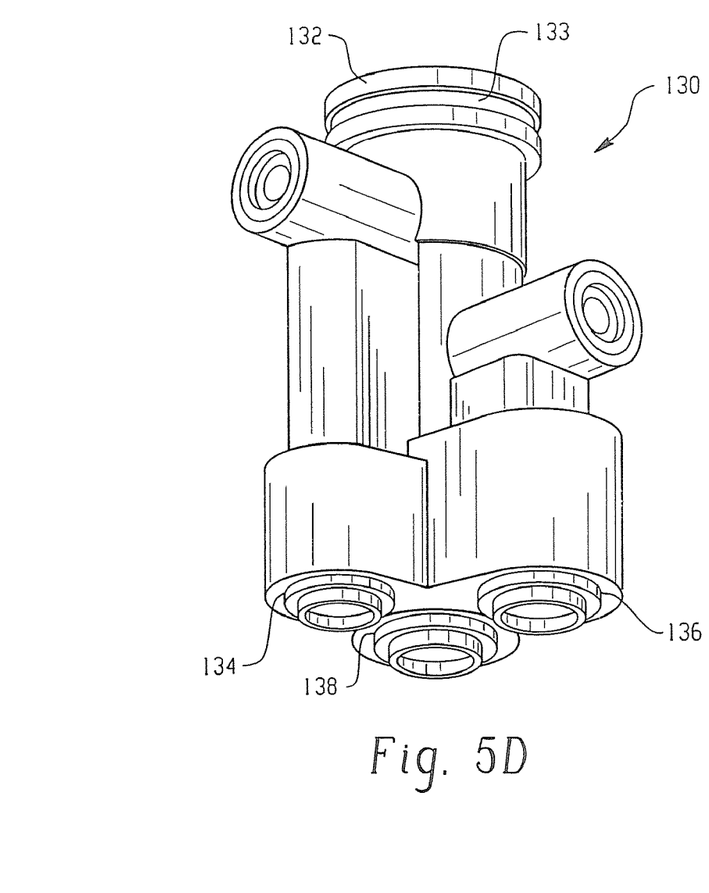

As best shown in FIGS. 2 and 5C-D, lower body portion 130 typically includes a plurality of ports for connecting the valve to various pneumatic lines. The plurality of ports provided on the exemplary embodiment of lower body portion 130 includes exhaust port 134, delivery port 136, and supply port 138. A series of PTC (push-to-connect) fittings 190, 192, and 194 may be inserted into the ports for ease of connection to the pneumatic lines. A plurality of ribs 140 may be formed on the exterior of lower body portion 130. The orientation of the ports on lower body portion 130 may be either horizontal (see FIG. 5C) or vertical (see FIG. 5D). Other configurations of the ports and lower body portion 130 are possible.

As previously stated, control valve 100 is configurable or reconfigurable in that multiple upper body/lower body combinations are possible. In the exemplary embodiments, there are four potential configurations for control valve 100: (a) linearly translating handle with horizontal pneumatic ports; (ii) linearly translating handle with vertical pneumatic ports; (iii) rotationally translating handle with horizontal pneumatic ports; and (iv) rotationally translating handle with vertical pneumatic ports. These multiple configurations are possible due to the two-part design of the valve body and the connecting means 160 or the connector 161 that attaches the two body parts to one another.

Figure 3:
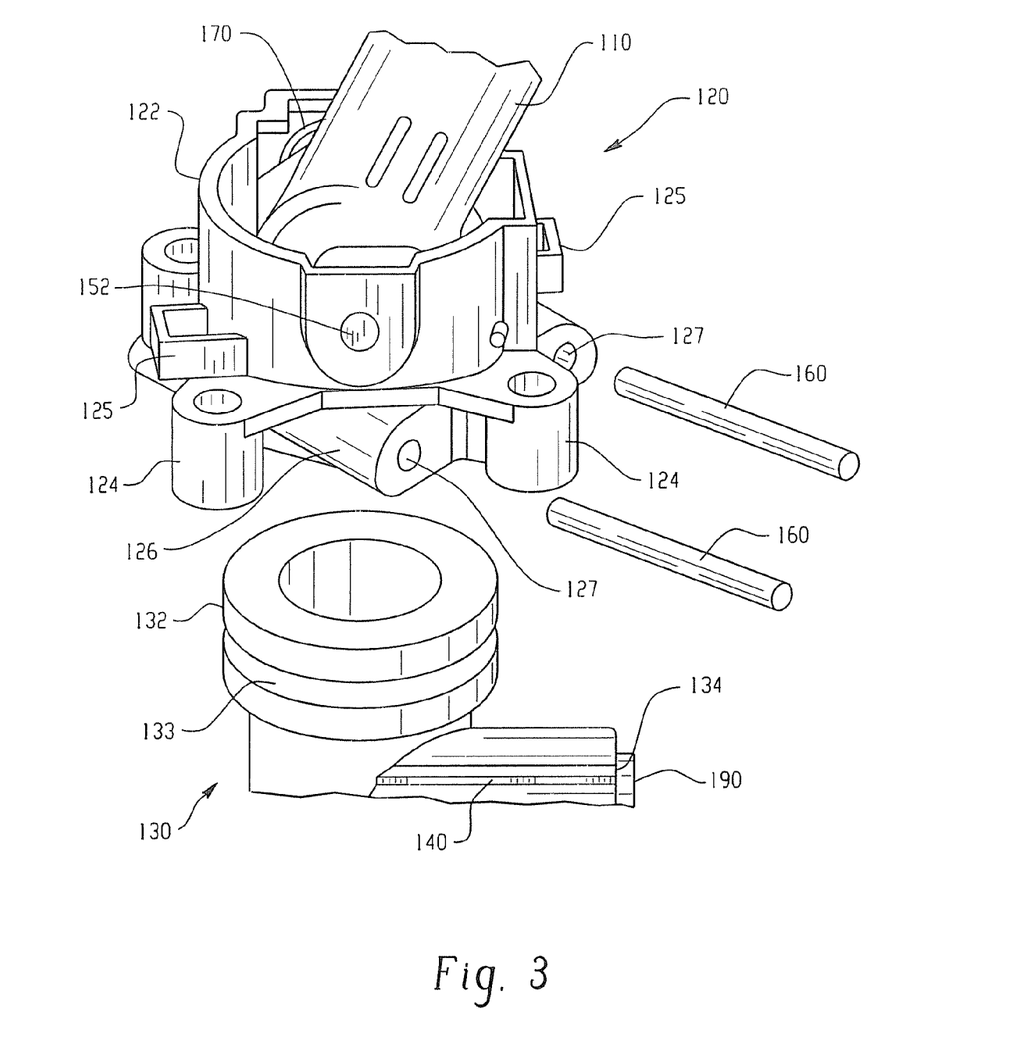
FIG. 3 is an exploded perspective view of one embodiment of the valve of the present invention showing the relative positions of the handle, upper body portion, connecting means, and lower body portion.
Figure 4:
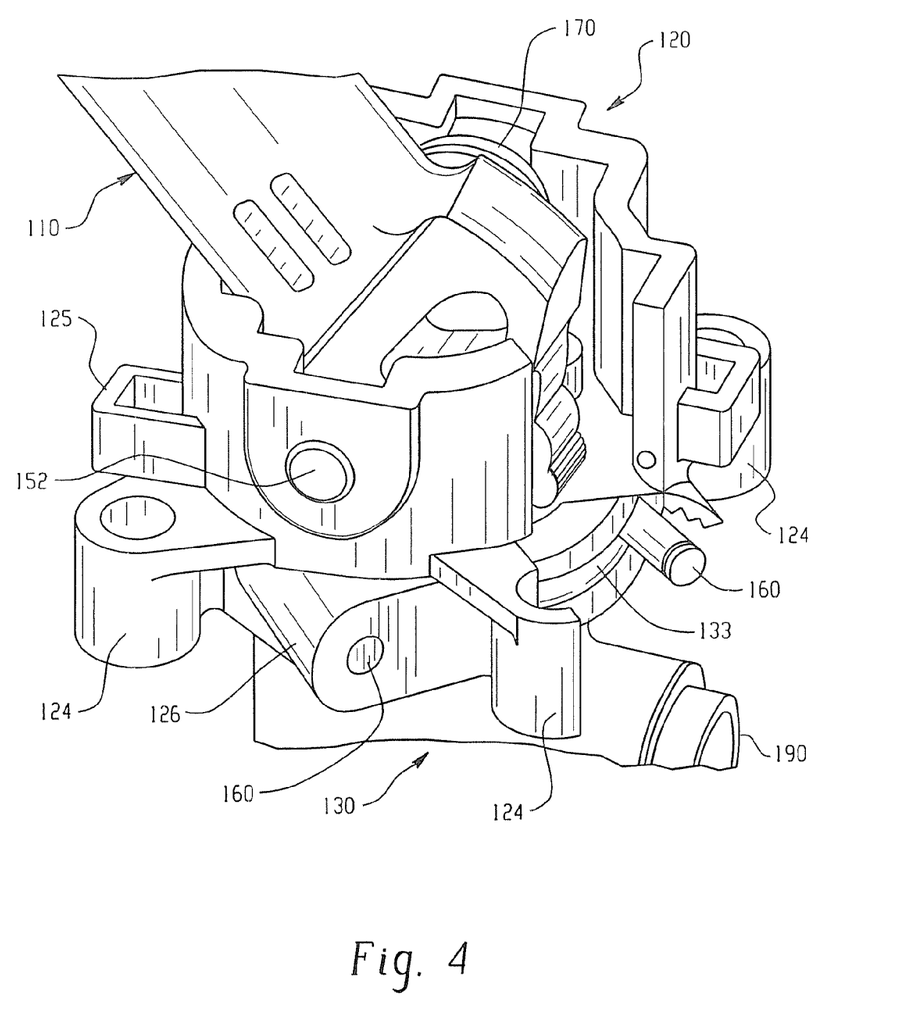
FIG. 4. is a perspective view of one embodiment of the valve of the present invention showing the relative positions of the handle, upper body portion, connecting means, and lower body portion.

FIGS. 3-4 provide perspective views of the linearly translating handle and horizontal pneumatic port configuration. FIG. 3 provides an exploded view and FIG. 4 shows the assembled valve. In this exemplary embodiment, lower body portion 130 includes flange 132, which encircles the top of this portion of the valve body. A circumferential groove 133 is formed in flange 132. Upper body portion 120 includes a base 126 that further includes a centrally placed, downwardly facing, circular opening. Base 126 also includes two bores 127 that form internal passages in and through base 126. A portion of each internal passage intersects with and traverses the circular opening in base 126. The internal diameter of bores 127 is slightly greater than the diameter of the connecting means 160 (i.e., groove pins). Groove 133 is also slightly larger than the diameter of each pin 160.

To assemble the exemplary embodiment of valve 100, handle 110 is attached to handle receiving portion 122 of upper body portion 120. The circular opening in base 126 is then placed over the flange 132 of lower body portion 130 such that the internal passages formed by bores 127 align with groove 133. A connecting means, i.e., a pin 160, is then completely inserted into each bore 127. The length of each pin corresponds to the length of the internal passages formed by each of the bores 127; thus, the end portions of each pin 160 reside in base 126 and the middle portion of each pin 160 engages groove 133 (see FIG. 4) The spatial relationship and respective geometries of the pins 160 and the groove 133 allow upper body portion 120 and lower body portion 130 to rotate 360° relative to one another before any pneumatic lines are attached to valve 100.

Figure 6A:
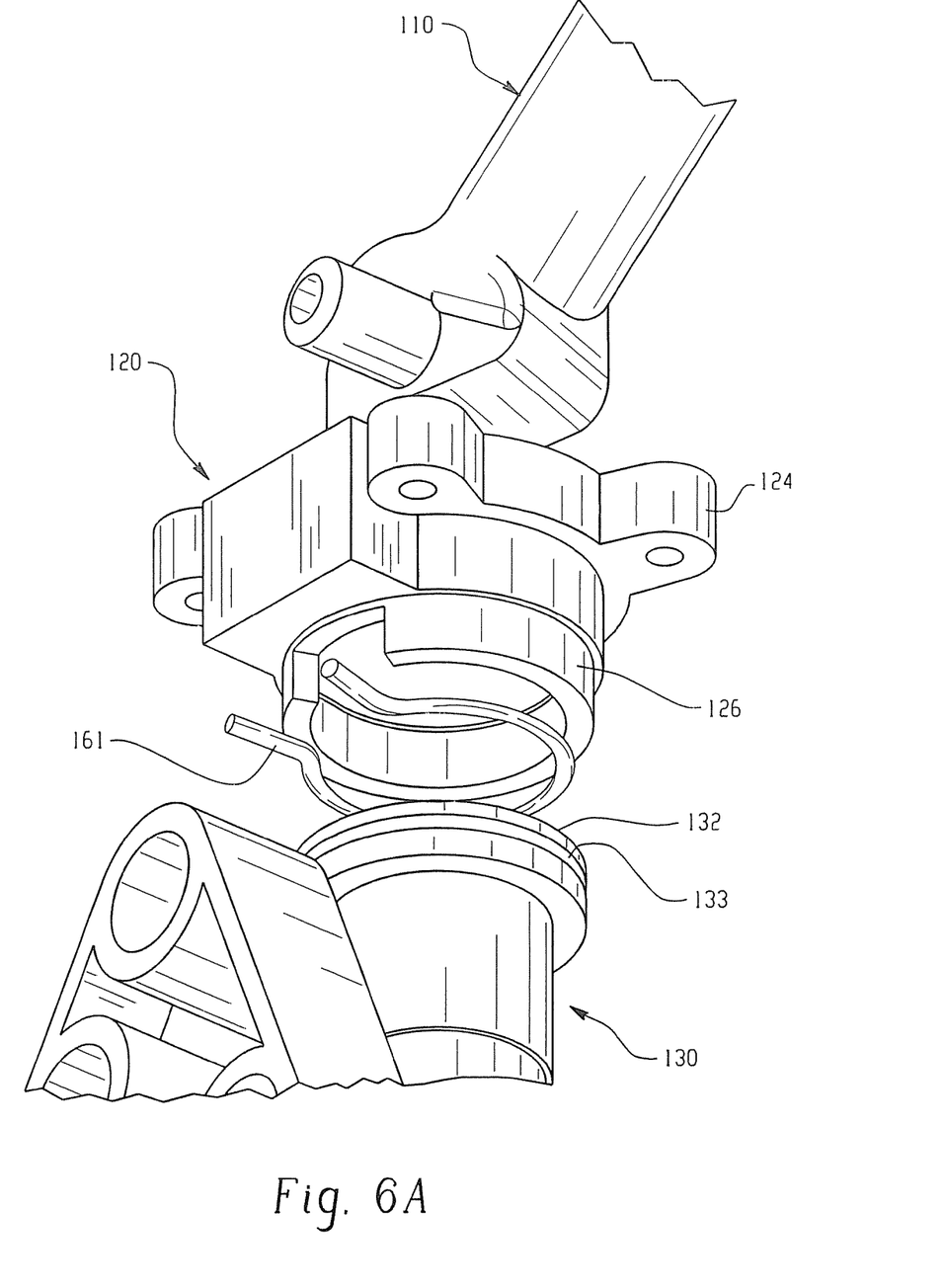
FIGS. 6A-C are perspective views of alternate embodiments of valve of the present invention showing the connector for attaching the upper body portion to the lower body portion.
Figure 6B:
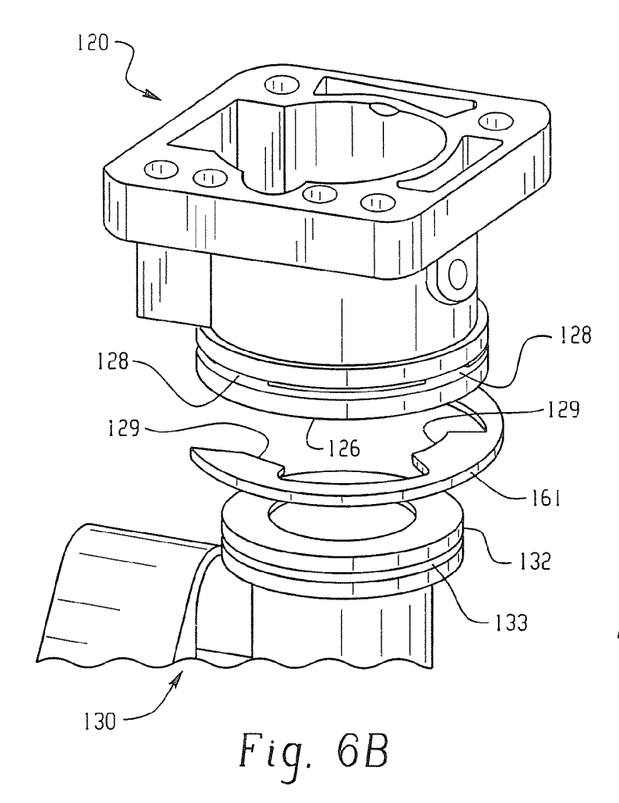
Figure 6C:
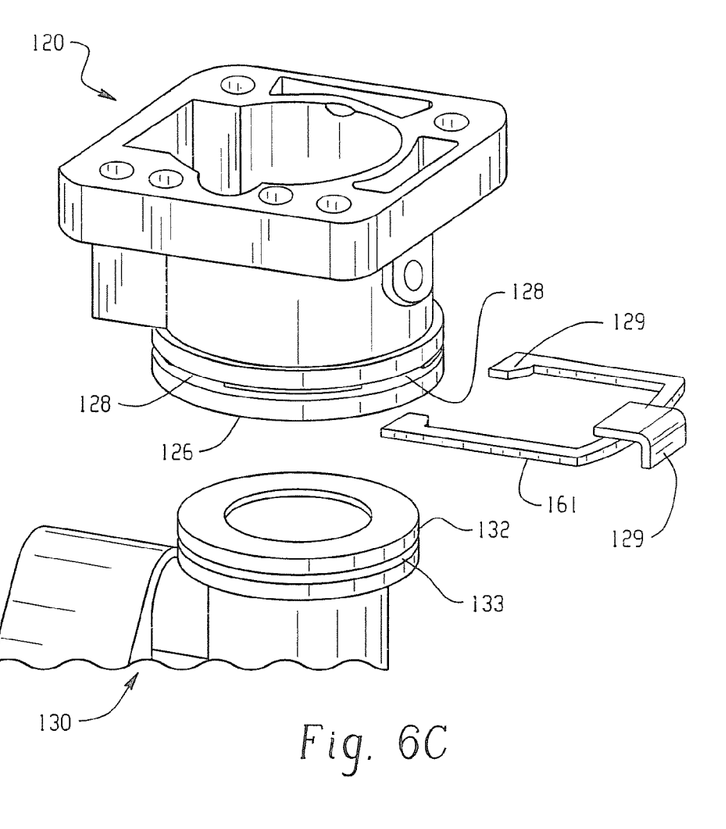

Other embodiments of the present invention are possible. The embodiment shown in FIG. 6A includes a one-piece connector 161 that attaches upper body portion 120 to lower body portion 130. In this embodiment, connector 161, which is substantially ring-shaped spring, is positioned within groove 133 and compressed. Base 126 of upper body portion 120 is then lowered onto flange 132 and the pressure on connector 161 is released. Connector 161 expands slightly and engages base 126, thereby attaching upper body portion 120 to lower body portion 130. The embodiment shown in FIG. 6B also includes a one-piece connector 161 that attaches upper body portion 120 to lower body portion 130. In this embodiment, base 126 includes a plurality of slots 128 and connector 161 includes a plurality of protrusions 129. In this embodiment, upper body portion 120 is lowered onto lower body portion 130 and, when properly placed, connector 161 attaches the two body portions to one another. The protrusions 129 of connector 161 pass through slots 128 and engage groove 133. The embodiment shown in FIG. 6C also utilizes a one-piece connector 161, which includes a plurality of protrusions 129 that engage a series of slots 128 formed in upper body portion 120. In all of these embodiments, the spatial relationship and respective geometries of the connectors 161 and the groove 133 allow upper body portion 120 and lower body portion 130 to rotate 360° relative to one another.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A control valve for an air brake system having at least one source of pressurized air and at least one brake in communication with the control valve, comprising:
    (a) a first body portion, the first body portion comprising at least one internal passage;
    (b) a second body portion, the second body portion comprising at least one groove formed therein;
    (c) a connecting means for attaching the first body portion to the second body portion; and
    (d) wherein the connecting means cooperates with the first body portion and the second body portion to allow the body portions to rotate relative to one another.

2. The control valve of claim 1, further comprising a moveable handle attached to the first body portion, wherein the handle controls the function of the control valve.

3. The control valve of claim 2, wherein the handle further comprises a linear translation.

4. The control valve of claim 2, wherein the handle further comprises a rotational translation.

5. The control valve of claim 1, wherein the second body portion further comprises a plurality of ports, and wherein the ports are horizontally oriented.

6. The control valve of claim 1, wherein the second body portion further comprises a plurality of ports, and wherein the ports are vertically oriented.

7. A control valve for an air brake system having at least one source of pressurized air and at least one brake in communication with the control valve, comprising:
    (a) a first body portion, the first body portion comprising a plurality of slots formed therein;
    (b) a second body portion, the second body portion comprising at least one groove formed therein;
    (c) a connecting means for attaching the first body portion to the second body portion; and
    (d) wherein the connecting means cooperates with the first body portion and the second body portion to allow the body portions to rotate relative to one another.

8. A control valve, comprising:
    a first body defining a first opening, the first body further comprising at least one internal passage;
    a second body having an attachment portion that is received within the first opening, the second body further comprising at least one groove formed therein; and
    a connector that engages the attachment portion and the first body to retain the attachment portion within the first opening; wherein the connector allows the first and second bodies to rotate relative to one another.

9. The control valve of claim 8, wherein the connector is a one-piece connector.

10. The control valve of claim 8, wherein the connector is a pin.

11. The control valve of claim 8, wherein the attachment portion comprises a flange having a circumferential groove that receives a portion of the connector.

12. The control valve of claim 8, further comprising a moveable handle attached to the first body, wherein the handle controls the function of the control valve.

13. The control valve of claim 8, wherein disengaging the connector from the attachment portion allows the first body to be disassembled from the second body.

14. The control valve of claim 8, wherein the second body further comprises a plurality of radially aligned ports.

15. The control valve of claim 8, wherein the second body further comprises a plurality of axially-aligned ports.

16. A control valve comprising:
    a first body defining a first opening, the first body further comprising a plurality of slots formed therein;
    a second body having an attachment portion that is received within the first opening, the second body further comprising at least one groove formed therein; and
    a connector that engages the attachment portion and the first body to retain the attachment portion within the first opening; wherein the connector allows the first and second bodies to rotate relative to one another.

17. A method for assembling a control valve, comprising:
    attaching a handle to a first body, wherein the first body includes an opening;
    inserting an attachment portion of a second body into the opening; and coupling the first body to the attachment portion such that the first body and the second body are held together while allowing the first and second bodies to rotate relative to each other.

18. The method of claim 17, wherein coupling the first body to the attachment portion further comprises engaging the first body and the attachment portion with a connector, and wherein disengaging the connector from the attachment portion decouples the first body from the second body.

19. A control valve, comprising:
    a first body defining a first opening;
    a moveable handle attached to the first body, wherein the handle controls the function of the control valve;
    a second body having a plurality of ports and a flange having a circumferential groove, each port being adapted to attach to a fluid line, and wherein the flange is received within the first opening of the first body;
    a one-piece connector that engages the groove to secure the first body to the second body, wherein disengaging the one-piece connector from the groove allows the first body to be disassembled from the second body, and wherein the connector allows the first and second bodies to rotate relative to one another.

* * * * *